Nov. 29, 1955  E. L. TRIMAN  2,724,918
TAPER CHEMICAL MILLING APPARATUS
Filed Oct. 4, 1954  3 Sheets-Sheet 1

*INVENTOR.*
EUGENE L. TRIMAN
BY
William R. Lane
ATTORNEY

Nov. 29, 1955   E. L. TRIMAN   2,724,918
TAPER CHEMICAL MILLING APPARATUS
Filed Oct. 4, 1954   3 Sheets-Sheet 2

INVENTOR.
EUGENE L. TRIMAN
BY
William R. Lane
ATTORNEY

Nov. 29, 1955  E. L. TRIMAN  2,724,918
TAPER CHEMICAL MILLING APPARATUS
Filed Oct. 4, 1954  3 Sheets-Sheet 3

INVENTOR.
EUGENE L. TRIMAN
BY William R. Lane
ATTORNEY

United States Patent Office 2,724,918
Patented Nov. 29, 1955

2,724,918

TAPER CHEMICAL MILLING APPARATUS

Eugene L. Triman, Whittier, Calif., assignor to North American Aviation, Inc.

Application October 4, 1954, Serial No. 459,965

12 Claims. (Cl. 41—9)

The present invention is directed to apparatus to control chemical taper milling. More particularly this invention concerns apparatus for controlling the amount and rate at which a workpiece may be tapered by a chemical etching milling process. The apparatus disclosed and claimed herein is particularly useful in the selective chemical milling process disclosed in co-pending application Serial No. 389,289, filed October 30, 1953, by Manual C. Sanz. The apparatus herein disclosed is applicable, for example, for producing taper cross-sectioned metal sheets or tapered forms.

Various means have been proposed to control the characteristics of an etchant solution. For example, attempts at hydrogen ion concentration control, electrolytic conductivity control by providing additions to or dilution of the etchant material, and at strict temperature control have been made. While each of these control methods have applicability in general etching the tapering etching process brings in an additional variable, namely, that the etching attack is not equally applied over the entire surface of the workpiece. The apparatus of the present invention takes into consideration this variable while avoiding the complex problems of etchant additive metering and precise bath temperature control attendant to the prior control methods.

The present invention provides a tapering control system which monitors changes in etchant concentration (i. e., conductivity) and temperature and thereby compensates by providing a corresponding change in the exposure rate of the workpiece to the etchant action. Tapering is accomplished by providing a predetermined varying exposure of the workpiece to the attack of a chemical etchant kept at constant level or by varying the level of the etchant while keeping the workpiece stationary. In either case, the change in linear surface exposure to the etchant is made at a rate dependent on the etching rate, measured in mils per hour, of the etching bath. In the instant tapering system, both the etchant concentration and temperature are allowed to vary within reasonable limits while adjusting the rate of surface exposure.

An object of this invention is to provide an apparatus for controlling the tapering of chemically milled workpieces.

A further object of this invention is to provide an electromechanical apparatus for automatically controlling the tapering of a workpiece by chemical means.

A still further object of this invention is to provide an apparatus for electronically controlling the etch tapering of a workpiece.

An additional object of this invention is to provide control apparatus for taper milling of a workpiece in which the workpiece is alternately exposed to and removed from the action of an etchant fluid.

A further object of this invention is to provide a control apparatus for chemical taper etching in which the conductivity and temperature of the etching bath may vary.

A still further object of this invention is to provide means for controlling the etching rate of a workpiece being chemically milled.

The above objects as well as other objects of this invention will be apparent from the following description, in which Fig. 1 schematically shows one form of the invention;

Figure 5:
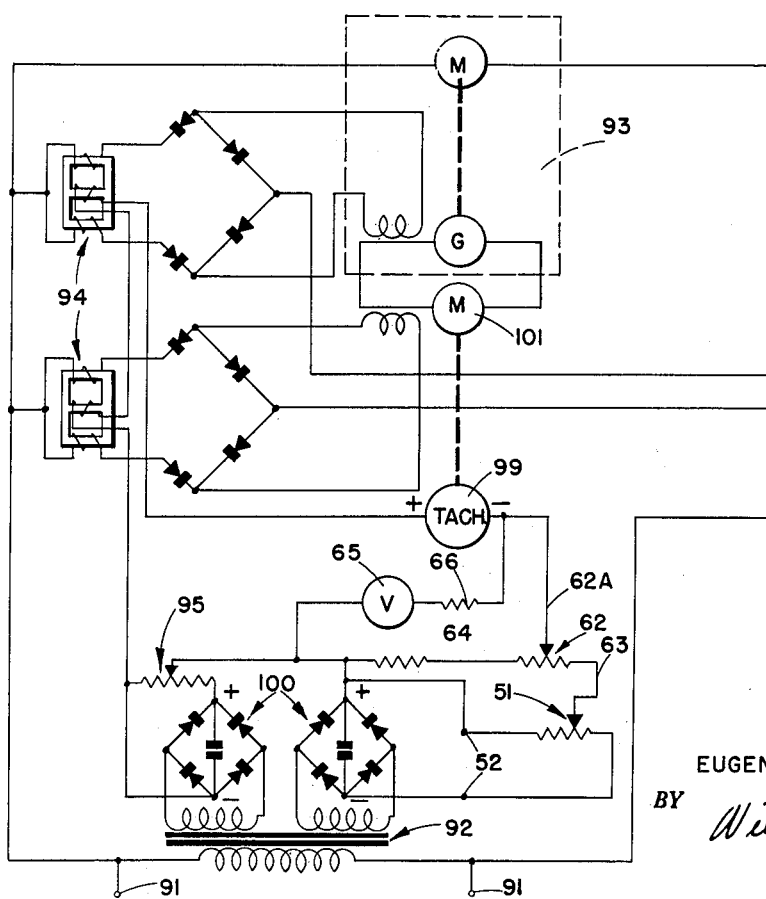

And Fig. 5 shows a typical motor control for adjusting exposure rate.

Figure 1:
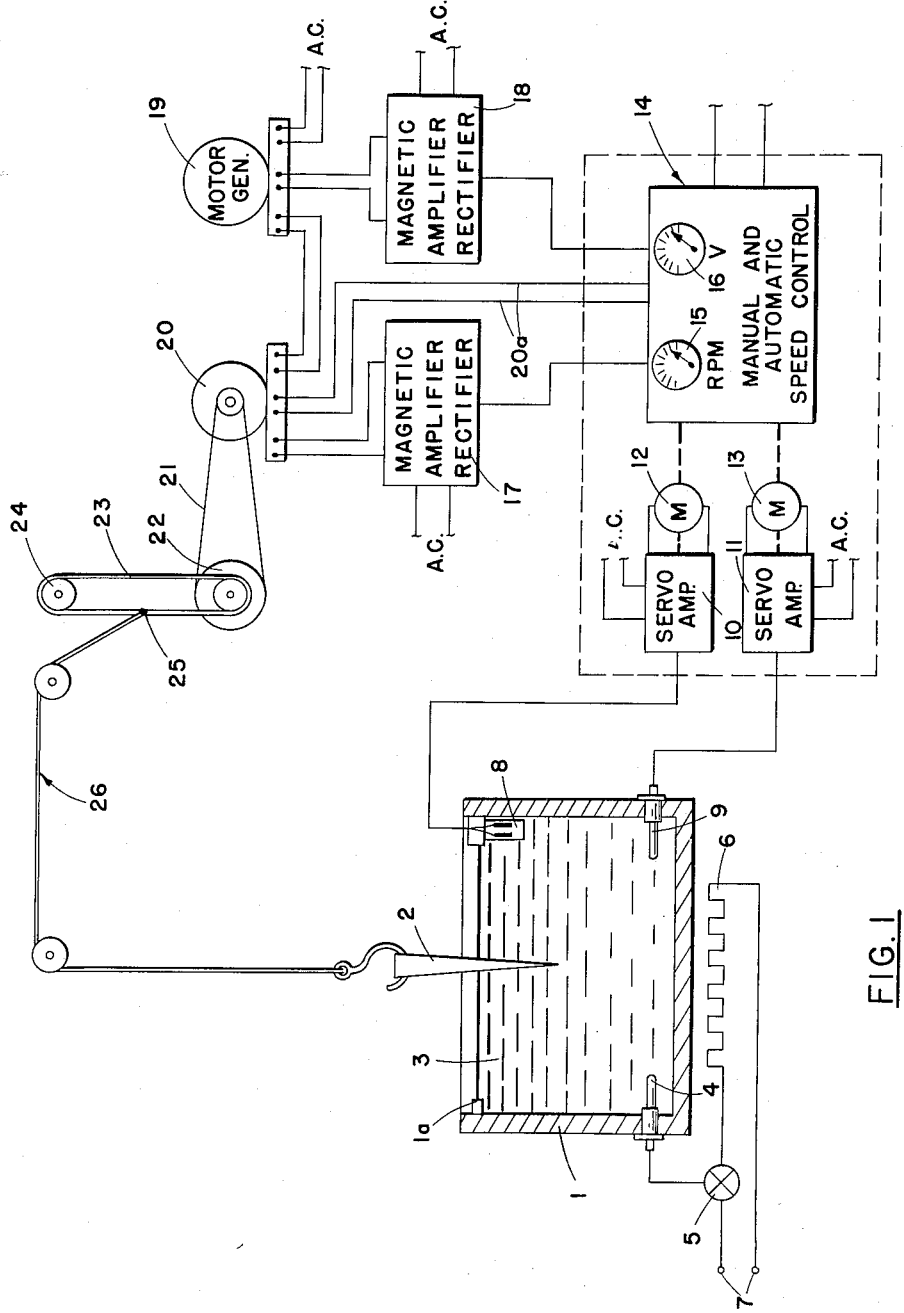

A typical automatic control for taper etching is schematically shown in Fig. 1. An etching tank 1 having an etchant fluid 3 therein is provided for milling the workpiece. The etchant 3 is kept at a constant level in the tank 1 by means of a level controller, such as a float valve 1a, and is kept within a relatively broad temperature range by means of a temperature resistance element 4 and a heater coil 6 powered by voltage source 7 through a switch 5. It is not necessary in the present invention to keep the fluid 3 at a constant temperature since the temperature may be varied within broad limits. An etchant conductivity measuring means 8, generally comprising a conductivity cell, and an etchant temperature measuring means 9, generally comprising a temperature responsive bulb, is provided within the tank 1, in an entrance or exit to tank 1, or in a reservoir for the fluid 3. It is necessary that the means 8 and 9 be exposed to the same conductivity and temperature as the operating part of the bath 3.

In Fig. 1 the workpiece 2 is lowered and raised in the fluid 3 in order to taper the workpiece 2. This lowering and raising procedure may be in the form of a single excursion (i. e., lowering in slowly once and removing, or the reverse), a single cycle (lowering slowly once, raising slowly once), or in the form of multiple cycles. In the case of an aluminum workpiece being etched with caustic soda (NaOH) at an etch rate of 1 mil/minute one excursion may be made per minute to give a satisfactory taper. It is to be understood that the workpiece 2 may be held stationary within the tank 1 and the level of the etchant fluid 3 changed by a variable rate pump in order to give the same effect as if the workpiece 2 were lowered and raised in the etchant fluid. This latter alternative may further incorporate means to remove any solids occurring in the bath during the etching action by means of centrifuging the liquid being pumped into and out of the tank 1.

Operational control of the system is accomplished by sensing voltages from said conductivity cell and said temperature bulb. Varying signals from means 8 and 9, representing changes in conductivity and temperature are fed to the servo amplifiers 10 and 11 and operate the servo motors 12 and 13 in response to the changes. The motors 12 and 13 are coupled to and drive potentiometers (shown at 51 and 62 in Fig. 2) in the manual and automatic speed control 14. Normally, a visual R. P. M. meter 15 and a voltmeter 16 calibarted in etching rate are provided in the speed control assembly 14. The potentiometers heretofore mentioned in control 14 (shown as 51 and 62 in Fig. 5) and an initial speed setting potentiometer 95 provide control current for magnetic self-saturating reactor type amplifiers (shown at 94 in Fig. 5) which supply current to the separate shunt fields of a speed control generator 19 and exposure drive motor 20. A manual speed-regulating circuit containing a feedback tachometer-generator, operating from the exposure drive motor 20 through leads 20a, is also provided in the control 14. Suitable reference voltages are fed into the servo amplifiers, the speed control, the magnetic amplifiers, and the motor generator, as shown. Typically, the exposure drive motor 20, speed controlled by the signal received through the potentiometers from the means 8 and 9, drives a drive belt 21 turning a sheave 22 and a movable belt 23 rotating around a second sheave 24. Attached to the movable belt 23 is a linkage 25 connected to the raising and lowering equipment 26.

It is apparent that many equivalent means may be used for raising and lowering the workpiece 2 in the etching tank 1. For example, cam means or various gear arrangements may be provided to give this motion. It is furthermore to be realized that the exposure drive motor 20 may also intermittently operate a pump to change the level of the etchant fluid while the workpiece 2 remains stationary. In either case, the apparatus shown compensates for changes in conductivity and temperature during the tapering process.

With the arrangement shown, an operator first consults the etch rate indicator 16 located on the automatic speed control 14 and adjusts the manual speed setting (shown at 95 in Fig. 5) until the desired R. P. M. of the drive motor 20 is obtained. The speed setting of motor 20 is dependent upon the predetermined varying exposure necessary to give the desired slope or taper to the workpiece. The initial speed setting of the motor 20 is compensated automatically thereafter for any changes in bath temperature or conductivity which may alter the etching rate. The control action produces an increase in exposure drive motor speed to compensate for an increase in temperature alone, a decrease in exposure drive motor speed to compensate for decrease in temperature alone, and a proportionate increase or decrease which is the resultant of disproportionately concurrent changes in conductivity and temperature.

Figure 2:
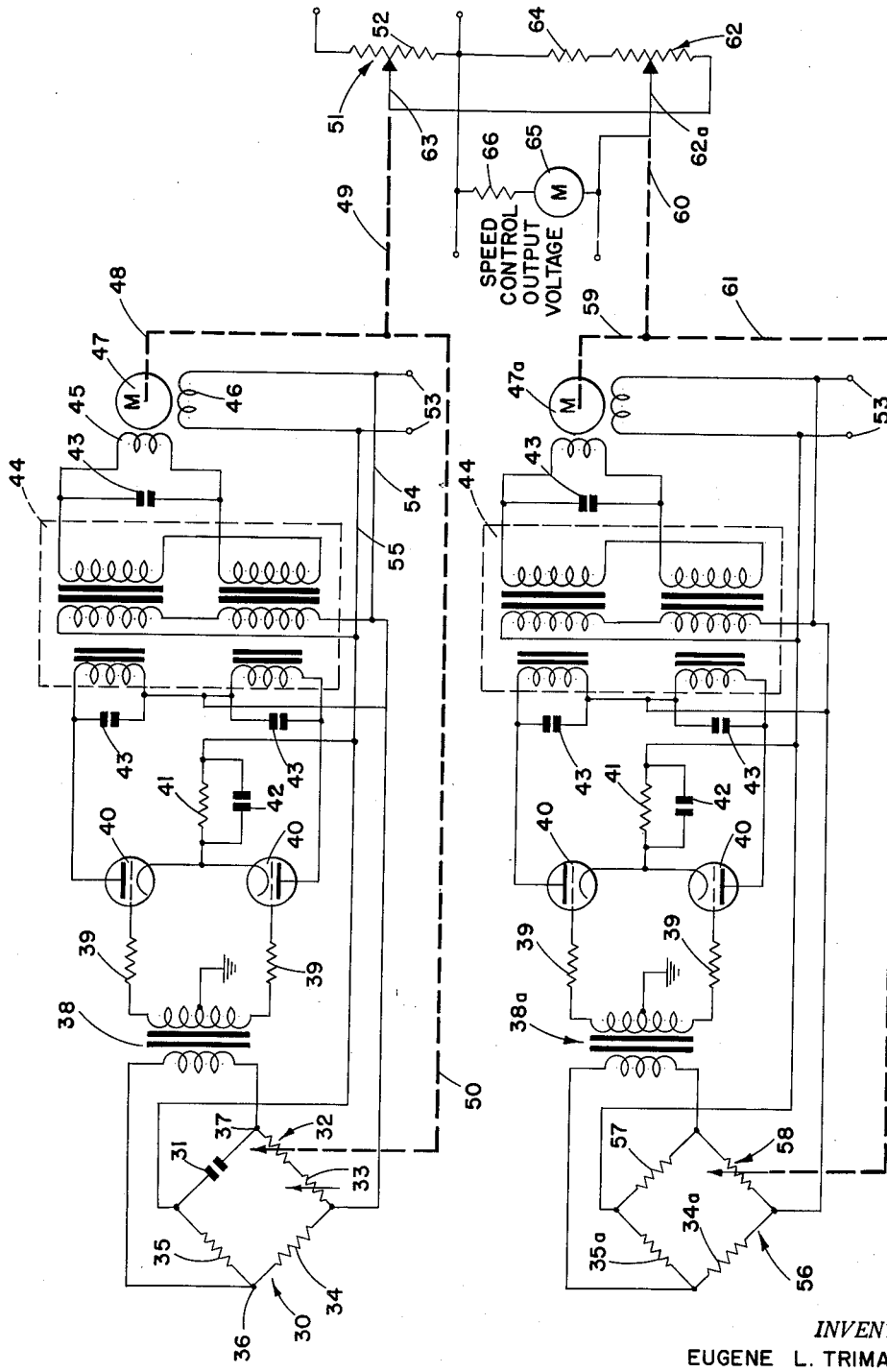
Fig. 2 shows in detail the circuit schematically shown in Fig. 1.

Fig. 2 illustrates in detail a typical circuit for controlling the output voltage to the speed control. In the schematic shown the sense elements for temperature and conductivity are connected in bridge circuits adapted for the purpose. In the bridge circuit 30 a conductivity cell 31, a balance arm potentiometer 32, a calibration resistor 33, and fixed resistances 34 and 35 are included. The calibration resistor 33 may be a manual adjustment or may be part of a servo control system which senses bath specific gravity to automaticaly compensate for such variables as the effect of solids and etching residues which may contaminate the bath. When the calibration resistor 33 has been adjusted to a value to offset the voltage developed across the electrodes of the conductivity cell 31 in view of the position of the balance arm in the potentiometer 32, no voltage is imposed across points 36 and 37. A change in the conductivity of the solution as measured by the conductivity cell 31 will create an imbalance in the bridge and cause a voltage to appear across the points 36 and 37. This voltage is passed through a step-up transformer 38 through a typical amplifying circuit. The amplifying circuit comprises grid resistors 39, tubes 40, cathode bias resistor 41, stabilizing condenser 42, noise by-pass condensers 43 and a magnetic amplifier 44. The magnetic amplifier is of conventional design. The amplified signal or voltage is applied through the motor winding 45 of servo motor 47. A reference voltage 53 is likewise supplied to the other motor winding 46 of the two-phase servomotor 47. The reference voltage 53 is also connected to the bridge circuit by means of leads 54 and 55 in order to provide the proper phase relationship between the voltage change developed in the conductivity cell 31 and the reference voltage. The motor shaft 48 of the servomotor is mechanically connected by linkage means 50 to the balance arm of the potentiometer 32. In addition, the shaft 48 of the servomotor 47 is connected to the balance arm of a potentiometer 51, linearly wound or wound to a function related to the bath parameters, by linkage 49. A reference voltage 52 is applied across the windings of the potentiometer 51.

A similar circuit senses changes in temperature in the bath. In Fig. 2, the temperature bridge 56 includes a temperature resistance bulb 57 and a second balance arm potentiometer 58. A voltage is developed across the bulb 57 which is pre-balanced by the resistors 34a and 35a to form a balanced bridge. Any changes in the temperature of the bath will unbalance the bridge 56 and show up as a voltage into the transformer 38a. This signal is then amplified in a manner shown with respect to the signal from the conductivity bridge 30. In the illustrated schematic the various tubes, resistors, and condensers in the temperature sensing circuit correspond in function, but not necessarily in value, to their counterparts in the conductivity side of the over-all circuit. The amplified signal from bridge 56 shows up as a movement of the shaft 59 of servomotor 47a, which is mechanically linked to the balance arm of the potentiometer 58 by linkage 61 and to a linearly wound potentiometer 62 by linkage 60. Voltage to potentiometer 62 is supplied by the pickoff 63 on the potentiometer 51. A fixed divider resistance 64 is provided in series with the winding of potentiometer 62. The balance arm 62a of the potentiometer 62 picks off a voltage that is proportional to changes both in the conductivity of the bath and in the temperature of the bath. This picked-off voltage is the speed control output voltage as is illustrated in Fig. 2. Normally a voltmeter 65, calibrated to give a direct reading of etching rate, and a meter multiplier resistor 66 is placed across the output voltage lines. It can be seen that the temperature servo system is controlled by the temperature resistance bulb 57 in a bridge arrangement similar to that of the conductivity circuit. A phase-sensitive power stage drives the servomotor 47a and is operative from error signals obtained when the temperature bridge is unbalanced. Thus, any unbalanced voltage due to the mismatch of resistance bulb 57 and potentiometer 58 causes positioning of the movable arm 62a of the linear potentiometer 62 through linkage 60 and shaft 59. Similarly, mismatch of the resistance value of cell 31 and potentiometer 32 causes a signal across the bridge 30 at 36 and 37 which is amplified to energize the servomotor 47 for correct directional rotation to adjust potentiometer 32 to a null balance. Mechanically coupled by means 48 and 49 to the same servomotor 47 is the balance arm of the logarithmically wound potentiometer 51 in the etch rate computing network. The fixed resistance 64 in the etch rate computing network divides the voltage output of the potentiometer 51 into correct proportions according to a predetermined relation.

Figure 3:
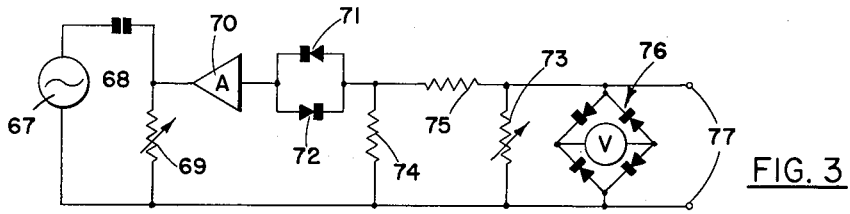
Fig. 3 shows electronic means for sensing changes in conductivity and temperature.

Fig. 3 illustrates a signal circuit for controlling the speed of the drive motor or pump motor, as the case may be, which determines the rate of exposure of the workpiece to the etchant fluid. The essentially electronic circuit illustrated in Fig. 3 includes a tone generator 67, a conductivity cell 68, a calibration resistor 69, a constant gain amplifier 70, voltage sensitive resistors or varistors 71 and 72, resistors 74 and 75, a temperature-sensitive element 73 and a rectifier type voltmeter 76 giving an output voltage 77.

Operation of this particular circuit is as follows: The voltage across the calibration resistor 69 is adjusted to a predetermined value under standard conductivity conditions. Changes in bath conductivity, sensed by conductivity cell 68, cause proportional changes in the voltage across the calibration resistor 69. These changes are amplified and applied to the terminals of a logarithmic converter consisting of two varistors 71 and 72 connected in reverse parallel and assembled in series with the resistance 74. The voltage across resistance 74 is small and, if a non-linear relationship is desired, varies essentially in logarithmic proportion as the voltage across the calibration resistance 69 changes in value. Resistances 73 and 75 form a dividing network to operate on the voltage across the resistance 74 proportionately as the temperature of the bath varies in which resistance 73 is immersed. Resistance 73 is a temperature sensitive element calibrated for the range required. The output voltage value 77 is indicated by a rectifier type voltmeter 76 preferably calibrated in mils per hour etching rate. The output voltage 77 is the equivalent of the speed control output voltage illustrated in Fig. 2. Fig. 3 thus shows means generating an etchant conductivity signal at 68, a temperature signal at 73, amplifying means to amplify the voltage responsive to changes in etchant fluid conductivity, means responsive to changes in etchant fluid temperature modifying said amplified voltage, and a speed control adapted to be coupled to drive motor means (Fig. 2) responsive to the modified voltage 77 to change the amount or rate of exposure of the workpiece to the etchant fluid.

Figure 4:
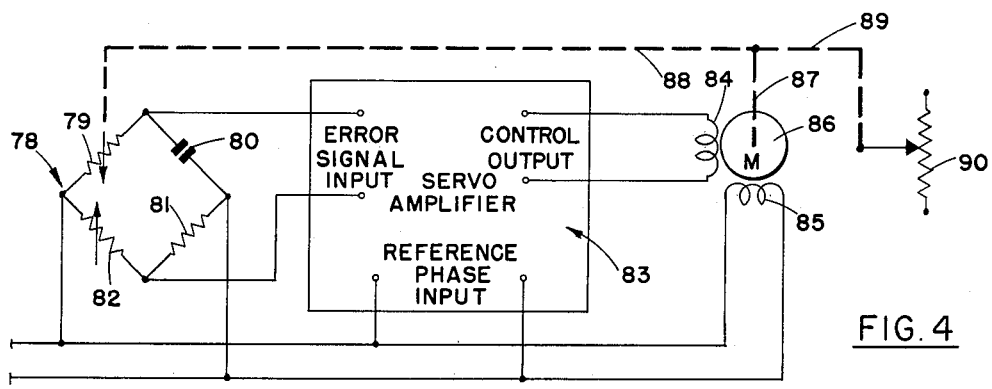
Fig. 4 shows simplified electromechanical means for controlling tapering automatically.

Fig. 4 represents a simplification of the circuit illustrated in Fig. 2 and of the over-all motor speed control illustrated in Fig. 1. The circuit illustrated in Fig. 4 is adapted for use when the exposure drive motor or pump is provided with an integral control rheostat or potentiometer as part of the motor speed control circuit. This integral control rheostat or potentiometer is illustrated at 90 in Fig. 4. A combined conductivity and temperature bridge 78 is provided which includes a logarithmically wound balancing resistor 79, a conductivity cell 80, a fixed resistor 81 and a temperature resistance element 82. Normally the bridge will be balanced to a null for zero error signal by operation of the servo amplifier 83 and motor 86 through mechanical or hydraulic means 87, 88 and the balance arm of the potentiometer 79. A shift deviation in the conductivity or temperature of the bath will cause unbalance and a resultant error signal input to the servo amplifier, as illustrated. The amplifier will drive the servomotor in the direction corresponding to the phase of the error voltage until the balance arm of the potentiometer 79 reduces the error signal to a null value. The effect of variations in resistance in the temperature element 82 is to change the balancing ratio required for the potentiometer 79 in comparison with the conductivity cell 80. The result is that a temperature compensation is obtained whereby each balanced position of the potentiometer 79 corresponds to a discrete value of etching rate of the bath. A pointer can be fixed to the shaft of the movable arm of the potentiometer 79 and a calibrated scale setup so that the pointer indicates etch rate directly in mils per hour. Mechanical or pneumatic linkage 89 is connected through the motor shaft 87 of the servomotor 86, energized by windings 84 and 85, to position the balance arm of the potentiometer 90. It is apparent that a slip clutch or the like may be put in the linkage 89 to offset actual speed from the shaft position to manually set or re-set the speed control 90.

Fig. 5 illustrates a speed regulating control system usable in the combination disclosed in Fig. 1. The speed regulating control system comprises a motor generator set 93, magnetic amplifier field supplies, and a variable speed D. C. motor 101. The latter is the exposure drive motor and its control circuit. Speed is regulated and controlled by means of changes in the shunt field excitation of the supply generator and the drive motor. Field excitation for each is obtained individually from self-saturating reactor magnetic amplifiers 94 connected in conventional circuits with metallic rectifiers. Variations in current through control windings of each reactor will produce changes in the current supply to each field. The control windings are shown connected in series. Current supplied to these windings consists of three sources connected in series. These include a D. C. voltage obtained from a manually adjustable potentiometer 95 for obtaining an initial speed setting, a D. C. voltage obtained from the speed control output voltage seen in Fig. 2 (as illustrated) or the voltage across terminals 77 in Fig. 3, and a voltage from a tachometer-generator 99 driven by the exposure drive motor serving as a feed-back control. The current which flows through the control winding of each self-saturating reactor is the resultant of the algebraic addition of the three mentioned voltages. A given bath conductivity and a given bath temperature causes a specific voltage to appear across the terminals of the speed control of Fig. 2 or Fig. 3. Each specific value of speed control voltage corresponds to a specific etch rate for the bath. Line voltage source 91 is normally fed through a constant voltage transformer 92 and a full wave bridge rectifier 100.

With a given manual setting of the speed reference the sum of the speed reference voltage and the etch rate voltage will produce a value such that the current through the reactor control windings will cause a specific speed of rotation of the drive motor. This is due to the fact that the tachometer-generator shown in the circuit of Fig. 5 is connected opposing the sum of the two control voltages with the result that an equilibrium speed is reached by the drive motor to balance the voltage differential to a predetermined value. Thus, with a fixed manual reference setting, a new speed is required of the drive motor to produce equilibrium speed consistent with each voltage value output of the speed controls of Fig. 2 or Fig. 3. The circuit thus provides a continuous speed regulation from the discrete summation of variables, one inherent in the motor drive and the others inherent in the chemical bath with the result that a predetermined milling action can be obtained without human supervision.

The present invention provides an automatic control usable in the chemical milling of a tapered workpiece. The tapering process may be used to taper in the manner shown in Fig. 1 or the workpiece may be suitably masked to give a tapered workpiece having abutments or lands on the surface thereof which have not been attacked by the etching fluid. Etching of tapered surfaces may be controlled using any suitable combination of the disclosed control means. Means must be provided in each of the disclosed devices to sense etchant conductivity and temperature changes, means provided to give a predetermined varying exposure of the workpiece to the etching action, and means provided, subject to variations in the etchant conductivity and etchant temperature, for changing the amount or rate of said exposure.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Apparatus for taper milling comprising an etchant tank, etchant conductivity measuring means, etchant temperature measuring means, means providing a predetermined varying exposure of the workpiece to etching action in said tank, and means responsive to variations in etchant conductivity and etchant temperature for changing the amount of said exposure.

2. Apparatus for taper milling comprising an etchant tank, conductivity measuring means in said tank, temperature measuring means in said tank, means providing intermittent exposure of a workpiece to an etching fluid in said tank, and means responsive to variations in conductivity and temperature for regulating the rate of said intermittent exposure.

3. Apparatus for taper milling comprising an etchant tank, conductivity measuring means, temperature measuring means, exposure drive motor, means connected to said motor to move a workpiece in and out of an etchant in said tank, and means responsive to variations in conductivity and temperature in said tank for regulating the speed of said motor and said in and out movement.

4. Apparatus for taper milling comprising an etchant tank, etchant fluid within said tank, means to alternately lower and raise a workpiece into and out of said fluid at a constant rate, means generating an etchant conductivity voltage, means generating an etchant temperature voltage, a reference voltage, means to amplify a difference between said conductivity and temperature voltages and said reference voltage, and means responsive to said difference to change the rate at which the workpiece is being lowered and raised.

5. The invention of claim 4 in which the means to amplify is a servo amplifier and the first-mentioned means includes an exposure drive motor.

6. The invention of claim 4 in which the means to amplify is a servo amplifier and the last-mentioned means includes a servomotor adapted to position a rate controller on the workpiece lowering and raising means.

7. The invention of claim 4 in which the means generating the conductivity and temperature voltage includes a conductivity cell and temperature resistance element, each in a separate bridge circuit.

8. The invention of claim 4 in which the means generating the conductivity and temperature voltage includes a conductivity cell and a temperature resistance element, each in the same bridge circuit.

9. Apparatus for taper milling comprising an etchant tank, etchant fluid within said tank, means providing a predetermined varying exposure of a workpiece to said etchant fluid, means generating an etchant conductivity signal, means generating an etchant temperature signal, a reference signal, means to amplify a difference between said conductivity and temperature signals and said reference signal, and means responsive to said difference to change the amount of exposure of said workpiece to said etchant fluid.

10. An apparatus for taper milling comprising an etchant tank, etchant fluid within said tank, means providing a predetermined varying exposure of a workpiece to said etchant fluid, means generating an etchant conductivity signal, means generating an etchant temperature signal, and amplifying means to amplify a voltage responsive to changes in etchant fluid conductivity, means responsive to changes in etchant fluid temperature modifying said amplified voltage, and means responsive to said modified voltage to change the amount of exposure of said workpiece to said etchant fluid.

11. Apparatus for automatically controlling the chemical milling of a tapered workpiece in an etchant bath comprising etchant conductivity measuring means, etchant temperature measuring means, and means responsive to senses from said conductivity measuring means and temperature measuring means to vary the exposure of the workpiece in said etchant bath.

12. Apparatus for automatically controlling the chemical milling of a tapered workpiece comprising an etchant tank, etching rate measuring means, means providing a predetermined varying exposure of the workpiece to etching action in said tank, and means responsive to variations in etching rate for changing the amount of said exposure.

References Cited in the file of this patent

UNITED STATES PATENTS

| | | |
|---|---|---|
| 2,157,845 | Bernarde | May 9, 1939 |
| 2,434,286 | Pfann | Jan. 13, 1948 |
| 2,628,936 | Albano | Feb. 17, 1953 |